(No Model.)
R. GRACEY.
METHOD OF MAKING AXLE SKEINS.
No. 371,312. Patented Oct. 11, 1887.
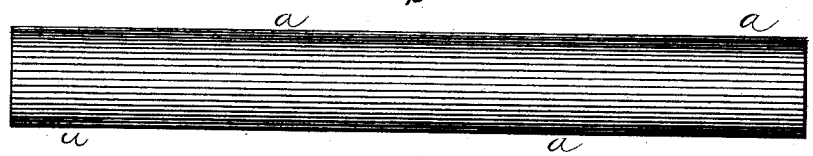
Fig. 1.
Fig. 2.
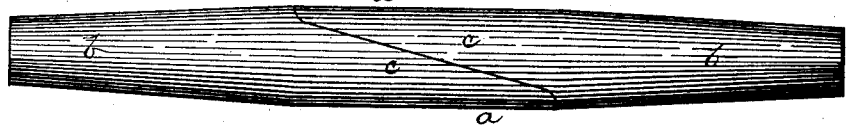
Fig. 3.
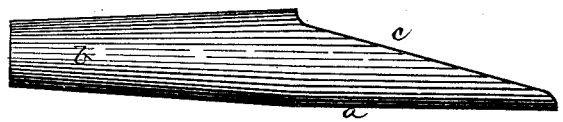
Fig. 4.
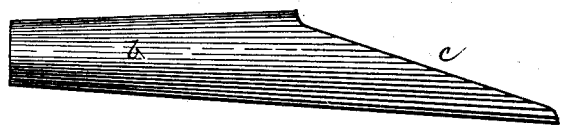
Fig. 5.
Fig. 6.
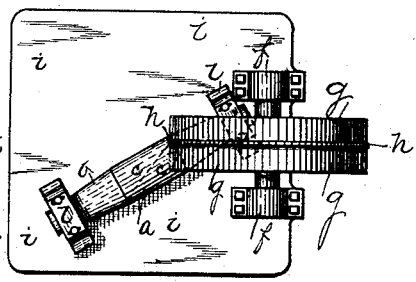
Fig. 7.
Witnesses:
Inventor.
Robert Gracey
By James J. Kay
Attorney

UNITED STATES PATENT OFFICE.

ROBERT GRACEY, OF ALLEGHENY CITY, PENNSYLVANIA, ASSIGNOR, BY DIRECT AND MESNE ASSIGNMENTS, TO WILLIAM F. PATTERSON, OF SAME PLACE.

METHOD OF MAKING AXLE-SKEINS.

SPECIFICATION forming part of Letters Patent No. 371,312, dated October 11, 1887.

Original application filed November 17, 1886, Serial No. 219,157. Divided and this application filed April 4, 1887. Serial No. 233,589. (No model.)

*To all whom it may concern:*

Be it known that I, ROBERT GRACEY, of Allegheny City, in the county of Allegheny and State of Pennsylvania, have invented a new and useful Improvement in Axle-Skeins; and I do hereby declare the following to be a full, clear, and exact description thereof.

My invention relates to the manufacture of axle-skeins from tubular metal, and more especially by a method which is a modification of that set forth in an application filed by me November 17, 1886, Serial No. 219,157, and of which application this is a division.

In the application above referred to the essential features of the method of making axle-skeins therein claimed consist in the cutting of a tube section on a diagonal line to form two blanks with tail portions from one piece of metal and without waste, then tapering one end of each of the blanks thus formed to produce the spindle portion, and finally setting back the tail portion to produce the finished skein.

In the method which forms the subject-matter of this application, and which is partly described in the application above referred to, a tube-section of sufficient length to produce two skein-blanks is tapered on each end to form the spindle portions of the skein. Then a diagonal cut is made through the center of the tapered section thus produced to form two skein-blanks with tail portions, each of which subsequently has its tail portion set back in line with the spindle portion to produce the finished skein, as will be more fully hereinafter set forth.

To enable others skilled in the art to make and use my invention, I will describe the same, referring to the accompanying drawings, in which—

Figure 1 represents a tube-section from which two skeins are to be formed. Fig. 2 represents the section after the first step of the method. Fig. 3 shows the second step of this method—that is, the cutting of the blank on the diagonal line. Fig. 4 shows the blank produced by this cutting operation. Fig. 5 shows the skein after the operation of setting back the tail portion in line with the spindle portion has been completed. Fig. 6 is a view of an apparatus for sawing the tube-sections into skein-blanks after they are tapered; and Fig. 7 is a plan view of the same, indicating the manner in which the skein is cut.

In practicing my invention I take a tube, $a$, of sufficient length to form the spindle portions $b$ of two skein-blanks and an additional length equal to that of the tail portion $c$ of one of said blanks, and by suitable apparatus—such as by the machine shown and described in a patent granted to me on April 28, 1885, No. 316,539—taper or reduce each end of this tube to form the spindle portions $b$, as shown in Fig. 2. The tapered tube-section thus produced is then cut at about its middle on a diagonal line, which may be straight or an ogee curve, to form from the tube-section two blanks, each with a tail portion, $c$. To effect this cutting operation a handsaw or chisel may be used, or a band-saw such as shown in the drawings. This sawing apparatus consists of a pulley, $d$, which is carried by a shaft, $d'$, journaled in a suitable frame, $e$, the latter having thereon a standard, $f$, which supports the upper pulley, $g$, over which and the lower pulley, $d$, passes the band-saw $h$, rotary motion being imparted to the shaft $d'$ by a belt, $j$, from any suitable motive power.

Supported by the standard $f$, between the upper and lower pulleys, is a table, $i$, which is provided with a slot, $k$, therein for the passage of the band-saw $h$, and on this table the blank $a$ is placed, after having had first clamped thereto at each end a heavy block, $l$, which serves to hold the blank down on the table and prevent it from turning on its axis while it is being fed to the saw. The blank $a$, being thus supported by the blocks $l$ on the table $i$, is fed by hand to the saw $h$, the necessary angle being given to the blank from time to time to produce the required curved line of division. The blocks $l$, with a certain amount of pressure exerted by the hand on the blank, will be sufficient to maintain it in position during the cutting operation, more especially so if the saw cuts downward. After the blank $a$ has thus been severed into two blanks, each provided with a tail portion, $c$, the latter is set-back on the line with the spindle portion, as shown in Fig. 5—that is, to give to the skein a continuous line of taper from its apex to the end of the tail portion. This operation of setting back the tail portion is accomplished by the apparatus set forth and described in an application filed by me November 17, 1886, Serial No. 219,157, heretofore referred to, which apparatus, briefly stated, consists of a mold corresponding in shape to that of the finished skein, and in which the blank is inserted and supported while hot, and a former, corresponding in shape to that of the mold, driven therein by a hammer or other suitable means, which causes the tail portion to be forced backward against the mold and in line with the spindle portion, giving the necessary taper to the entire skein, and finishing the blank ready for the reception of the usual collar and the formation of the linchpin-hole or threaded portion at the lower end.

What I claim as my invention, and desire to secure by Letters Patent, is—

1. The method of making axle-skeins which consists in first tapering both ends of a tube to form the spindle portions of two skeins, then dividing said tube into two parts by a diagonal line, whereby two skeins, each having a tail portion, are produced without loss of metal, substantially as set forth.

2. The method of making axle-skeins which consists in first tapering both ends of a tube to form spindle portions of two skeins, then dividing said tapered tube by a diagonal line to form two skein-blanks, each with a tail portion, and finally setting back said tail portions in line with the spindle portions, substantially as described.

In testimony whereof I, the said ROBERT GRACEY, have hereunto set my hand.

ROBERT GRACEY.

Witnesses:
JAMES I. KAY,
J. NEGLEY COOKE.